(12) United States Patent
Jiang et al.

(10) Patent No.: US 9,410,068 B2
(45) Date of Patent: Aug. 9, 2016

(54) METHOD FOR PREPARATION OF BIOMIMETIC POLYMER FOR STABILIZING WELLBORE AND DRILLING FLUID

(71) Applicant: China University of Petroleum (Beijing), Beijing (CN)

(72) Inventors: Guancheng Jiang, Beijing (CN); Yang Xuan, Beijing (CN); Xianzhu Wu, Chengdu (CN); Junbin Chen, Chengdu (CN); Wei Ouyang, Chengdu (CN); Taotao Luo, Chengdu (CN)

(73) Assignee: China University of Petroleum (Beijing) (CN)

( * ) Notice: Subject to any disclaimer, the term of this patent is extended or adjusted under 35 U.S.C. 154(b) by 16 days.

(21) Appl. No.: 14/862,795

(22) Filed: Sep. 23, 2015

(65) Prior Publication Data

US 2016/0053156 A1    Feb. 25, 2016

Related U.S. Application Data

(63) Continuation of application No. 14/611,086, filed on Jan. 30, 2015.

(30) Foreign Application Priority Data

Feb. 24, 2014   (CN) .......................... 2014 1 0062056

(51) Int. Cl.
| | | |
|---|---|---|
| *C09K 8/035* | (2006.01) | |
| *C08B 37/08* | (2006.01) | |
| *C08L 5/08* | (2006.01) | |
| *C08L 51/02* | (2006.01) | |

(52) U.S. Cl.
CPC .............. *C09K 8/035* (2013.01); *C08B 37/003* (2013.01); *C08L 5/08* (2013.01); *C08L 51/02* (2013.01)

(58) Field of Classification Search
None
See application file for complete search history.

(56) References Cited

U.S. PATENT DOCUMENTS

| | | | | |
|---|---|---|---|---|
| 2002/0055560 | A1* | 5/2002 | Nanbu | ...................... B01J 13/16 524/21 |
| 2013/0034650 | A1* | 2/2013 | Li | .......................... A01N 25/28 426/650 |
| 2013/0157905 | A1* | 6/2013 | Saini | ...................... C09K 8/685 507/212 |

FOREIGN PATENT DOCUMENTS

CN        10308767690 A        5/2013

OTHER PUBLICATIONS

Yang Xuan, et al., "A biomimetic drilling fluid for wellbore strengthening", Petroleum Exploration and Development, vol. 40, No. 4, pp. 531-536, (Aug. 2013).
Junjie Wu, et al., "Mussel-Inspired Chemistry for Robust and Surface-Modifiable Multilayer Films", Langmuir, vol. 27, pp. 13684-13691, (2011).
Bruce P. Lee, et al., "Synthesis and Gelation of DOPA-Modified Poly(ethylene glycol) Hydrogels", Biomacromolecules, vol. 3, No. 5, pp. 1038-1047, (2002).

* cited by examiner

*Primary Examiner* — Jeffrey Washville
(74) *Attorney, Agent, or Firm* — Calfee, Halter & Griswold LLP

(57) ABSTRACT

The present invention provides a biomimetic polymer for stabilizing wellbore, a method for preparation of the biomimetic polymer, and a drilling fluid. The polymer contains carboxymethyl chitosan that serves as a backbone and dopamine-derived groups grafted on the backbone. The polymer provided in the present invention can improve the strength of shale in the wellbore, seal the shale pores and reduce the filter loss of drilling fluid, and thereby attains an effect of stabilizing the wellbore in shale formation in drilling process.

7 Claims, 2 Drawing Sheets

Initial     1h     3h

METHOD FOR PREPARATION OF BIOMIMETIC POLYMER FOR STABILIZING WELLBORE AND DRILLING FLUID

CROSS REFERENCE TO RELATED APPLICATIONS

The application claims for the priority of the patent application no. 201410062056.X titled as "Biomimetic Polymer for Stabilizing Wellbore and Method for Preparation of the Same and Drilling Fluid" filed on Feb. 24, 2014 with State Intellectual Property Office of China, the entire content of which is incorporated here by reference.

FIELD OF THE INVENTION

The present invention relates a biomimetic polymer for stabilizing wellbore, a method for preparation of the biomimetic polymer, and a drilling fluid.

BACKGROUND OF THE INVENTION

As the demand for oil and gas resources becomes higher increasingly in the world, more and more deep and ultra-deep wells, and shale gas well are drilled. Thus, the performance of drilling fluid treating agents must meet more demanding requirements. Wherein, the problem of wellbore stability in the well drilling process has always been a challenge not solved completely yet in the world, and accidents such as borehole caving, shrinkage, pipe sticking, and bit balling, etc. resulted from wellbore instability cause severe economic loss every year in the petroleum industry.

90% wellbore instability accidents in the drilling process happen in the shale formation, where the dispersion and exfoliation of shale resulted from hydrated swelling of clay in the shale is the root chemical factor for wellbore instability. As shale gas extraction becomes an important strategy in China, it is urgent task for drilling fluid researchers to ensure that the shale formation remains stable in the drilling process.

In the development in the past few decades, oil based drilling fluids always were an ideal choice for solving the problem of hydrated swelling of shale. However, as the national environmental laws become strict increasingly, the application of oil based drilling fluids is restricted owing to the severe damages of oil based drilling fluids to the environment. Hence, water-based drilling fluids with strong shale inhibition property have become a hot spot in the research again.

The inhibition property of a drilling fluid usually depends on the performance of the shale inhibitor in the drilling fluid. At present, in almost all shale inhibitors, the inhibition mechanism is realized by weakening the hydrated swelling of clay.

However, in existing commonly used shale inhibitors, the hydrated swelling of clay can't be inhibited completely. In addition, the pressure transfer from the drilling fluid to deep formation through nano-to-micro-sized pores and micro-fractures in shale is also a major cause for wellbore instability. At present, there is no appropriate drilling fluid plugging material that can effectively plug nano-to-micro-sized pores and micro-fractures.

Therefore, it is urgent task to seek for a technique that can be used to stabilize wellbore effectively.

SUMMARY OF THE INVENTION

To overcome the above-mentioned drawbacks in the prior art, the present invention provides a polymer that can effectively stabilize wellbore, a method for preparation of the polymer, and a drilling fluid that contains the polymer.

The byssus threads of a mussel can adhere to the rock surface in the water environment, and dopamine—a special amino acid derivative contained in byssus protein—is proved to be the key factor for strong subaqueous adhesion of mussel's byssus threads. When a mussel secretes byssus protein from its body onto a seabed rock surface, the dopamine groups in the byssus protein will have a cross-linking cure reaction with $Fe^{3+}$ ions in seawater, and thereby cohesive byssus threads with strong adhesion are formed, so that the mussel adheres to the rock surface. Enlightened by the strong subaqueous adhesion of mussel protein, the inventor of the present invention has found that a biomimetic polymer obtained by grafting dopamine to carboxymethyl chitosan can effectively stabilize wellbore. That could be because the polymer contacts with wellbore shale and is absorbed to the surface of shale along with the drilling fluid in the drilling process, and is cross-linked and cured under the complexing action between the dopamine groups and the $Fe^{3+}$ ions on the surface of shale to form a layer of polymer film in 100 μm-1 mm thickness (the thickness increases as the polymer concentration in the drilling fluid increases), which has strong adhesion. The polymer film not only can effectively prevent the drilling fluid from infiltrating into the formation, but also has enough strength to partially balance off the hydration stress borne on the rock, and thereby attains an effect of plugging the pores in the shale of wellbore and improving the strength of the shale. In addition, such a linear polymer that has a large number of branched chains can effectively plug capillary channels in bentonite mud cakes, and thereby greatly reduce the filter loss of drilling fluid.

In a first aspect, the present invention provides a polymer, wherein the polymer contains carboxymethyl chitosan that serves as a backbone and dopamine-derived group grafted on the backbone, and the dopamine-derived group is represented by the following formula II:

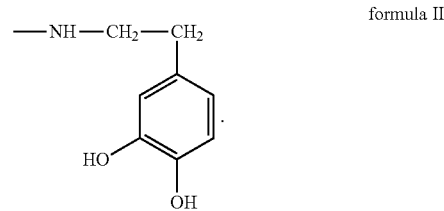

formula II

Preferably, the polymer contains constitutional units represented by the following formula I:

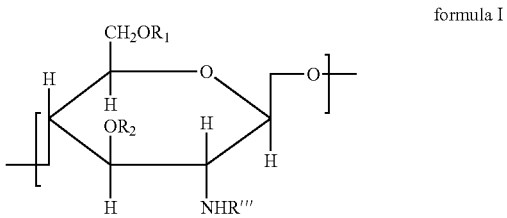

formula I

Wherein, $R_1$ is H,

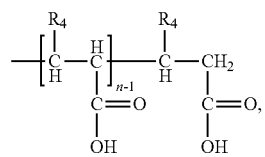

—CH$_2$COOR$_3$',

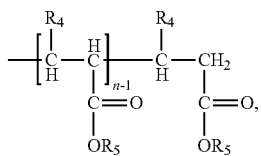

or —CH$_2$COOR$_3$, R$_2$ is H,

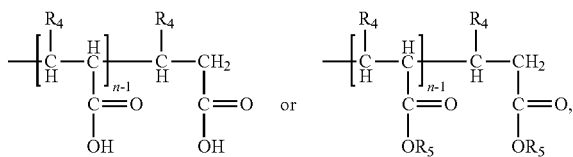

and at least one of R$_1$ and R$_2$ is

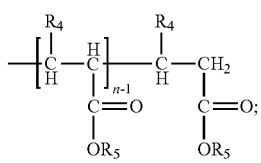

n is an integer equal to or greater than 1; each R$_5$ is H or the dopamine-derived group independently, and at least one of R$_5$ is the dopamine-derived group; R$_4$ is H or C$_1$-C$_{10}$ alkyl, R''' is H, —CH$_2$COOR$_3$' or —CH$_2$COOR$_3$, and R$_1$ and R''' are not H at the same time; R$_3$' is H or an alkali metal; and R$_3$ is the dopamine-derived group.

Preferably, the weight-average molecular weight of the polymer is 50,000 g/mol~100,000 g/mol.

Preferably, R$_4$ is C$_2$-C$_{10}$ alkyl.

Preferably, R$_4$ is C$_2$-C$_6$ alkyl.

In a second aspect, the present invention provides a method for preparation of a polymer that contains the constitutional units represented by formula I, comprising:

(1) allowing a polymer containing the constitutional units represented by formula III to have a graft copolymerization reaction with unsaturated carboxylic acid represented by general formula R$_4$CH═CHCOOH;

(2) allowing polymer obtained in step (1) to have a condensation reaction with dopamine and/or dopamine hydrochloride;

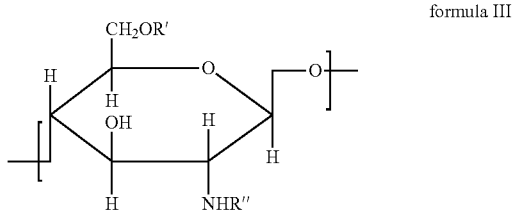

formula III wherein, R' and R'' are H or —CH$_2$COOR$_3$' independently, and R' and R'' are not H at the same time; R$_3$' is H or an alkali metal; and R$_4$ is H or C$_1$-C$_{10}$ alkyl.

Preferably, in step (1), the conditions of the graft copolymerization reaction include: temperature: reaction temperature is 50-90° C., preferably 60-80° C.; reaction time is 1-10 h, preferably 2-6 h; calculated in hydroxyl in the polymer that contains the constitutional unit represented by formula III, the mole ratio of the polymer containing the constitutional units represented by formula III to the unsaturated carboxylic acid is 1:0.1-4, preferably 1:0.5-3; the graft copolymerization reaction optionally proceeds with an initiator in presence, and the initiator is one or more selected from the group consisting of ammonium ceric nitrate, potassium persulfate, and ammonium persulfate.

Preferably, the carbon number in the unsaturated carboxylic acid is 3-11, preferably 3-7.

Preferably, in step (2), the conditions of the condensation reaction include: reaction temperature is 10-50, preferably 20-40° C.; reaction time is 2-48 h, preferably 6-36 h; the mole ratio of the amount of the polymer prepared in step (1) calculated in carboxyl to the total amount of the dopamine and dopamine hydrochloride calculated in amido is 1:0.01-0.2, preferably 1:0.02-0.1; the condensation reaction optionally proceeds with a catalyst in presence, and the catalyst is 1-(3-dimethylaminopropyl)-3-ethylcarbodiimide hydrochloride and/or N,N'-diisopropyl carbodiimide.

In a third aspect, the present invention provides a drilling fluid, wherein, the drilling fluid contains the polymer disclosed in the present invention as a wellbore reinforcer in part or in whole.

Preferably, based on the total weight of the drilling fluid, the content of the polymer is 1-7 wt %, preferably 3-5 wt %.

Preferably, the drilling fluid is a water-based drilling fluid.

Preferably, the water-based drilling fluid is one or more selected from the group consisting of fresh-water drilling fluid, salt water drilling fluid, potassium chloride-polyglycol drilling fluid, organic silicon drilling fluid, and cationic drilling fluid.

Preferably, the drilling fluid further contains an additive, which is one or more selected from the group consisting of filtrate reducer, viscosity improver, viscosity reducer, weight increaser, coating agent, and lubricant.

The polymer provided in the present invention can improve the strength of shale in the wellbore, seal the shale pores and reduce the filter loss of drilling fluid, and thereby attains an effect of stabilizing the wellbore in shale formation in a drilling process.

Other characteristics and advantages of the present invention will be further detailed in the embodiments hereunder.

DETAILED DESCRIPTION OF THE EMBODIMENTS

Figure 1:
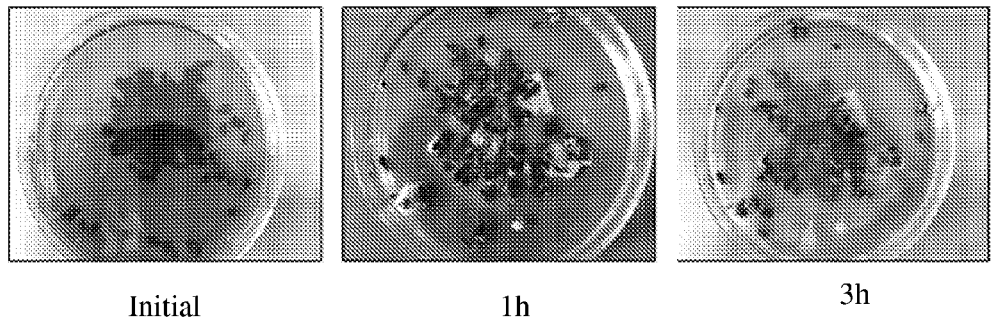
FIG. 1 provides photos that show the morphology change of shale debris observed within 1 h and 3 h respectively after the shale debris are immersed in 3 wt % GBFS-1 water solution.

Hereunder the embodiments of the present invention will be detailed. It should be appreciated that the embodiments described here are only provided to describe and explain the present invention, but shall not be deemed as constituting any limitation to the present invention.

The polymer provided in the present invention contains carboxymethyl chitosan that serves as a backbone and dopamine-derived groups grafted on the backbone. The dopamine-derived groups can be grafted to the carboxymethyl chitosan in a variety of ways.

According to a preferred embodiment of the present invention, the polymer provided in the present invention contains constitutional units represented by the following formula I:

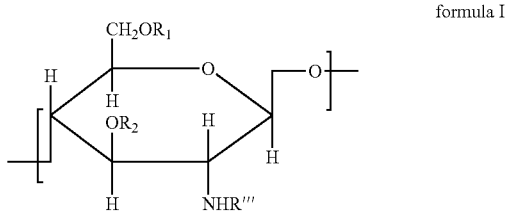
formula I wherein, $R_1$ is H,

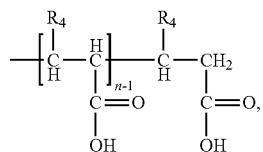

—$CH_2COOR_3'$,

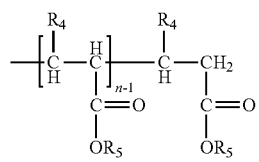

or —$CH_2COOR_3$, $R_2$ is H,

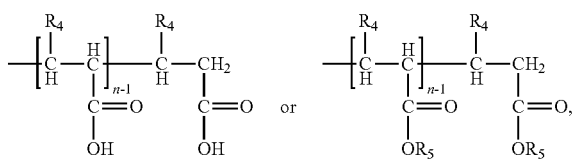

and at least one of $R_1$ and $R_2$ is

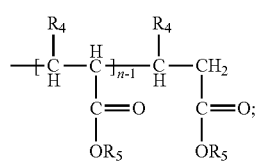

n is an integer equal to or greater than 1; each $R_5$ is H or the dopamine-derived group independently, and at least one of $R_5$ is the dopamine-derived group; $R_4$ is H or $C_1$-$C_{10}$ alkyl, R''' is H, —$CH_2COOR_3'$ or —$CH_2COOR_3$, and $R_1$ and R''' are not H at the same time; $R_3'$ is H or an alkali metal; and $R_3$ is the dopamine-derived group.

In the present invention, the dopamine-derived group is represented by formula II:

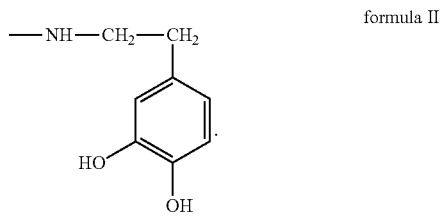
formula II

The weight-average molecular weight of the polymer is 20,000 g/mol~150,000 g/mol, preferably 50,000 g/mol~100,000 g/mol.

$R_4$ is preferably $C_2$-$C_{10}$ alkyl, more preferably $C_2$-$C_6$ alkyl. Examples of $R_4$ include, but are not limited to ethyl, propyl, isopropyl, and butyl.

The polymer provided in the present invention can be prepared with a method that comprises the following steps:

(1) allowing a polymer containing the constitutional units represented by formula III to have a graft copolymerization reaction with unsaturated carboxylic acid represented by general formula $R_4CH=CHCOOH$;

(2) allowing polymer obtained in step (1) to have a condensation reaction with dopamine and/or dopamine hydrochloride;

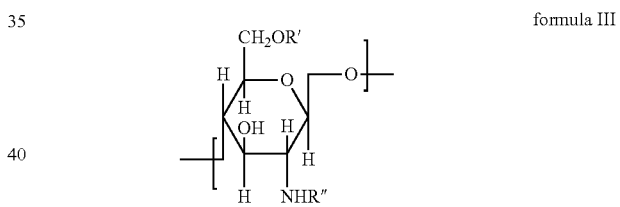
formula III wherein, R' and R'' are H or —$CH_2COOR_3'$ independently, and R' and R'' are not H at the same time; $R_3'$ is H or an alkali metal; and $R_4$ is H or $C_1$-$C_{10}$ alkyl.

In step (1), the conditions of the graft copolymerization reaction can include: reaction temperature is 50-90° C., preferably 60-80° C.; reaction time is 1-10 h, preferably 2-6 h; calculated in hydroxyl in the polymer containing the constitutional units represented by formula III, the mole ratio of the polymer containing the constitutional units represented by formula III to the unsaturated carboxylic acid can be 1:0.1-4, preferably 1:0.5-3; the graft copolymerization reaction can proceeds with an initiator in presence, and the initiator can be one or more selected from the group consisting of ammonium ceric nitrate, potassium persulfate, and ammonium persulfate.

The polymer containing the constitutional units represented by formula III is carboxymethyl chitosan. The carboxymethyl chitosan is mixed and contacts with the unsaturated carboxylic acid preferably in a form of water solution. The water solution of carboxymethyl chitosan can be obtained by dissolving carboxymethyl chitosan (with 10,000 g/mol~80,000 g/mol weight-average molecular weight) in water while stirring (the stirring rate can be 100-500 rpm). The volume of water can be determined appropriately, as long as the carboxymethyl chitosan can be dissolved completely; preferably, the weight ratio of carboxymethyl chitosan to water is 1:20-50.

The unsaturated carboxylic acid can be an unsaturated monocarboxylic acid with carbon number equal to or greater than 3. The carbon number in the unsaturated carboxylic acid is preferably 3-11, more preferably 3-7. The examples of the unsaturated carboxylic acid include, but are not limited to acrylic acid and/or methacrylic acid.

In step (2), the conditions of the condensation reaction can include: reaction temperature is 10-50° C., preferably 20-40° C.; reaction time is 2-48 h, preferably 6-36 h; the mole ratio of the amount of the polymer prepared in step (1) calculated in carboxyl to the total amount of the dopamine and dopamine hydrochloride calculated in amido can be 1:0.01-0.2, preferably 1:0.02-0.1; the condensation reaction can proceeds with a catalyst in presence, and the catalyst can be 1-(3-dimethylaminopropyl)-3-ethylcarbodiimide hydrochloride and/or N,N'-diisopropyl carbodiimide.

The drilling fluid provided in the present invention contains the polymer provided in the present invention as a wellbore reinforcer in part or in whole.

There is no specific restriction on the added amount of the polymer in the present invention. Even though an effect of stabilizing the wellbore can be attained as long as the polymer is added into the drilling fluid, preferably, based on the total weight of the drilling fluid, the content of the polymer is 1-7 wt %, in order to attain the object of the present invention in a better way. More preferably, based on the total weight of the drilling fluid, the content of the polymer is 3-5 wt %.

In the present invention, the drilling fluid can be any drilling fluid well known in the art; preferably, the drilling fluid is a water-based drilling fluid.

In the present invention, the water-based drilling fluid is a multi-phase dispersed system, in which water is the base constituent, and a variety of additives are added.

The water-based drilling fluid can be any water-based drilling fluid well known to the person skilled in the art. For example, the water-based drilling fluid can be one or more selected from the group consisting of fresh-water drilling fluid, salt water drilling fluid, potassium chloride-polyglycol drilling fluid, organic silicon drilling fluid, and cationic drilling fluid. Wherein, the water can be any water well known to the person skilled in the art; for example, it can be one or more selected from the group consisting of fresh water (tap water), seawater, and saline water. The potassium chloride-polyglycol drilling fluid can be any potassium chloride-polyglycol drilling fluid well known to the person skilled in the art; for example, it can be one or more selected from the group consisting of potassium chloride-polyethylene glycol drilling fluid, potassium chloride-polypropylene glycol drilling fluid, potassium chloride-ethylene glycol/propylene glycol copolymer drilling fluid, potassium chloride-polyglycerol drilling fluid, and potassium chloride-polyethylene glycol. The organic silicon drilling fluid can be any organic silicon drilling fluid well known to the person skilled in the art; for example, the organic silicon in the organic silicon drilling fluid can be one or more selected from the group consisting of sodium methylsiliconate, potassium methylsiliconate, and organic silicon potassium humate (OSAM-K). The cationic drilling fluid can be any cationic drilling fluid well known to the person skilled in the art; for example, the cations in the cationic drilling fluid can be one or more selected from the group consisting of 2,3-epoxypropyl trimethyl ammonium chloride, 3-chloro-2-hydroxypropyl trimethyl ammonium chloride, and cationic polyacrylamide.

In the present invention, to obtain a better drilling effect, a variety of additives well known to the person skilled in the art can be added into the drilling fluid. For example, the additives can be one or more selected from the group consisting of filtrate reducer, viscosity improver, viscosity reducer, weight increaser, coating agent, and lubricant.

In the present invention, there is no specific restriction on the added amount of the additives, which is to say, the added amount can be determined as required by the person skilled in the art to attain the expected effect. For example, based on the total weight of the drilling fluid, the content of the filtrate reducer can be 0.2-3 wt %, the content of the viscosity improver can be 0.2-1 wt %, the content of the viscosity reducer can be 0.2-1 wt %, the content of the weight increaser can be 0.2-3 wt %, the content of the coating agent can be 0.2-1 wt %, and the content of the lubricant can be 0.1-2 wt %.

The additives can be additives well known to the person skilled in the art. For example, the filtrate reducer can be one or more selected from the group consisting of pregelatinized starch, carboxymethyl starch, carboxymethyl cellulose, sulfonated phenol formaldehyde resin, sulfonated lignite resin, hydrolyzed polyacrylonitrile ammonium salt, and polyanionic cellulose (a water-soluble cellulose ether derivative prepared from natural cellulose by chemical modification); the viscosity improver can be one or more selected from the group consisting of xanthan gum, xanthan CXC polymer, carboxymethyl starch, methylol cellulose, hydroxyethyl cellulose, carboxymethyl cellulose, polyanionic cellulose (a water-soluble cellulose ether derivative prepared from native cellulose by chemical modification), and synthetic viscosity improver (partially hydrolyzed polyacrylamide); the viscosity reducer can be one or more selected from the group consisting of ferric chromium lignin sulfonate, sodium polyacrylate, sodium methylsiliconate, and sulfonated styrene-maleic anhydride copolymer; the weight increaser can be one or more selected from the group consisting of iron ore powder, calcium carbonate powder, mixture of barite and hematite, and galenite powder; the coater can be one or more selected from the group consisting of partially hydrolyzed polyacrylamide (liquid or powder), cationic polyacrylamide, and polyaluminium chloride; and the lubricant can be one or more selected from the group consisting of non-ionic surfactant, graphite, and polyglycol.

The drilling fluid provided in the present invention can be used in a variety of oil and gas wells, such as straight wells, directional wells, extended reach wells, and horizontal wells, etc.

Hereunder the present invention will be further detailed in some examples.

It should be noted that fresh water (tap water) is used to simulate a water-based drilling fluid and the polymer is prepared into a water solution with tap water in the examples of the present invention, for the convenience of measuring the effect of the polymer as a wellbore stabilizer.

In the following examples and comparative examples:

The weight-average molecular weight is measured with a gel permeation chromatograph (Model 2410, Waters Company (USA)), wherein, the solvent is water, the flow rate is 1 mL/min., and the test temperature is 40° C.

Example 1

1) Load 1,000 kg industrial water into a reactor, add 50 kg carboxymethyl chitosan (purchased from Beijing DaTian-FengTuo Chemical Technology Co., Ltd., with a structure represented by formula III, weight-average molecular weight is 52,000 g/mol, substitution degree of carboxymethyl is 1.4, the same below) while stirring; continue stirring after the materials are added, till the carboxymethyl chitosan is dissolved completely and there is no flocculated solid suspension in the solution essentially.

2) Add 50 kg acrylic acid into the water solution of carboxymethyl chitosan, stir for 5 minutes, and then add 2 kg nitric acid and continue stirring, till the carboxymethyl chitosan, acrylic acid, and nitric acid are mixed homogeneously in the solution; next, add 4 kg ammonium ceric nitrate, and stir till the ammonium ceric nitrate is dissolved completely. Then, heat up the reaction system to 70° C., start timing once the temperature in the reactor reaches 70° C., and let the reaction to proceed for 4 h. Then, cool down the reactor to 25° C. The product in the first stage is a straw yellow clear liquid.

3) Add 5 kg 1-(3-dimethylaminopropyl)-3-ethylcarbodiimide hydrochloride in the cooled reaction system (split 5 kg 1-(3-dimethylaminopropyl)-3-ethylcarbodiimide hydrochloride into 5 portions, stir for 15 minutes after a portion is added, and then add the next portion, till all of the portions are added). Then, stir for 10~16 h at room temperature, till the 1-(3-dimethylaminopropyl)-3-ethylcarbodiimide hydrochloride is dissolved completely. The product is still a straw yellow clear solution.

4) Add 5 kg dopamine hydrochloride into the system that contains dissolved 1-(3-dimethylaminopropyl)-3-ethylcarbodiimide hydrochloride, keep the reaction for 24 h at room temperature while stirring, till a final reaction product GBFS-1 is generated. The final reaction product is a pale brown clear liquid with certain viscosity. The measured weight-average molecular weight of the reaction product GBFS-1 is 84,320 g/mol.

Example 2

Prepare a polymer GBFS-2 with the same method as that used in example 1, wherein, the added amount of carboxymethyl chitosan is 50 kg and the added amount of dopamine hydrochloride is 5 kg, but the added amount of acrylic acid is 35 kg. The measured weight-average molecular weight of the reaction product GBFS-2 is 69,100 g/mol.

Example 3

Prepare a polymer GBFS-3 with the same method as that used in example 1, wherein, the added amount of carboxymethyl chitosan is 50 kg and the added amount of dopamine hydrochloride is 85 kg, but the added amount of acrylic acid is 35 kg. The measured weight-average molecular weight of the reaction product GBFS-3 is 93,250 g/mol.

Example 4

Prepare a polymer GBFS-4 with the same method as that used in example 1, wherein, the added amount of carboxymethyl chitosan is 50 kg and the added amount of acrylic acid is 50 kg, but the added amount of dopamine hydrochloride is 2.5 kg. The measured weight-average molecular weight of the reaction product GBFS-4 is 83,200 g/mol.

Example 5

Prepare a polymer GBFS-5 with the same method as that used in example 1, wherein, the added amount of carboxymethyl chitosan is 50 kg and the added amount of acrylic acid is 50 kg, but the added amount of dopamine hydrochloride is 8 kg. The measured weight-average molecular weight of the reaction product GBFS-5 is 85,380 g/mol.

Comparative Example 1

Prepare a dopamine-modified polyacrylic acid with the method disclosed in the literature (J. Wu, L. Zhang, Y. Wang, et al. Mussel-Inspired Chemistry for Robust and Surface-Modifiable Multilayer Films[J]. Langmuir, 2011, 27(22): 13684-13691).

Comparative Example 2

Prepare a dopamine-modified polyethylene glycol with the method disclosed in the literature (B. P. Lee, J. L. Dalsin, P. B. Messersmith. Synthesis and Gelation of DOPA-Modified Poly(ethylene glycol) Hydrogels[J]. Biomacromolecules, 2002, 3(5): 1038-1047).

Test Example 1

This test example is used to measure the wellbore reinforcing effect.

Immerse shale debris in 3 wt % water solution of GBFS-1, and observe the morphology change of the shale debris after 1 h and 3 h respectively. The result is shown in FIG. 1. In initial state, there is no other substance adhering to the surface of the shale debris immersed in the pale brown clear solution of GBFS-1. After 1 h immersion, a straw yellow sticky substance begins to form on the debris surface, and it glues adjacent small debris together. At this point, the bulk phase solution is still clear. After 3 h immersion, the coverage of the straw yellow sticky substance on the debris surface has expanded, and the gluing effect is stronger. At this point, the bulk phase solution away from the debris is still in clear state. Thus, it is apparent that the GBFS-1 provided in the present invention can effectively stabilize wellbore.

Test Example 2

This test example is used to measure the wellbore reinforcing effect.

Heat shale debris by roll-heating in tap water in a roller heater at 120° C. for 16 h, and then take out the debris, dry them, and observe the morphology of the debris. A SEM photo of the morphology is provided in FIG. 2.

Heat shale debris by roll-heating in 3 wt % water solution of GBFS-1 in a roller heater at 120° C. for 16 h, and then take out the debris, wash the debris surface with some clean water, and dry the debris; then, observe the morphology change of the shale debris. A SEM photo of the morphology is provided in FIG. 3.

Figure 2:
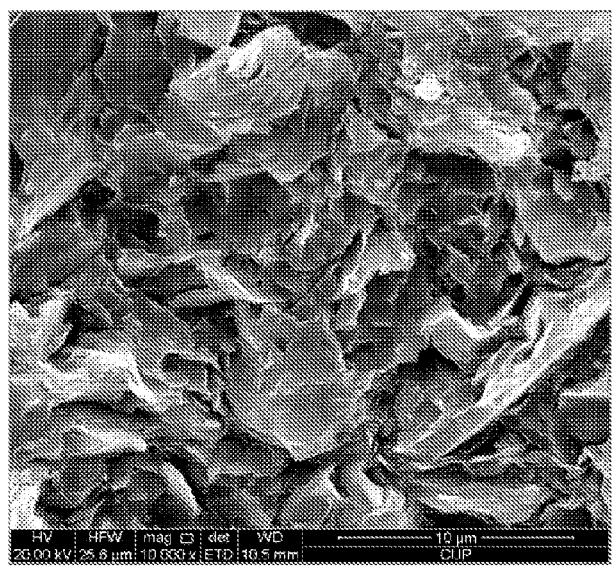
FIG. 2 provides a SEM photo that shows the morphology of shale debris after the shale debris are roll-heated for 16 h in tap water at 120° C. in a roller heater and then taken out and dried.
Figure 3:
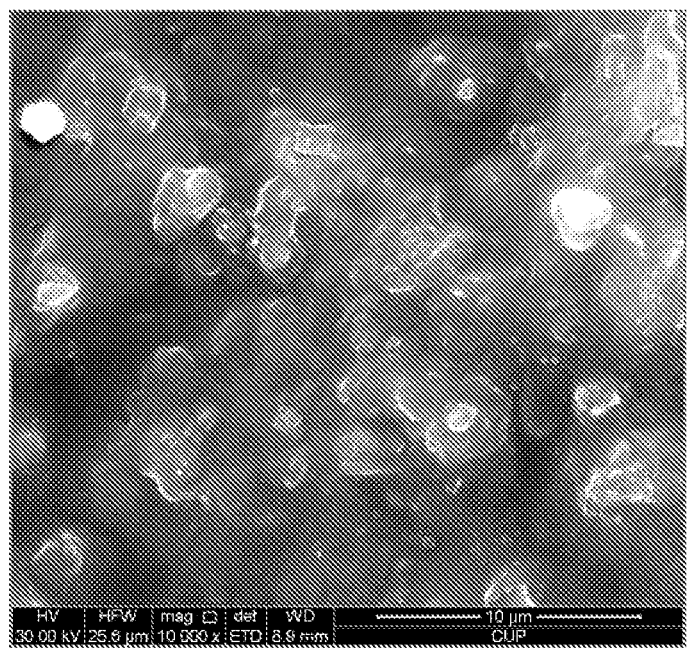
FIG. 3 provides a SEM photo that shows the morphology of shale debris after the shale debris are roll-heated for 16 h in 3 wt % GBFS-1 water solution at 120° C. in a roller heater and then taken out, washed with some clean water, and dried.

It can be seen from the comparison between FIG. 2 and FIG. 3: 3 wt % GBFS-1 forms a layer of dense polymer coating on the shale debris surface, and the pores of the debris are essentially plugged off.

Test Example 3

This test example is used to measure the filter loss reduction performance.

Add 3 wt % GBFS-1~GBFS-5, dopamine hydrochloride, dopamine-modified polyacrylic acid, and dopamine-modified polyethylene glycol into 4 wt % bentonite base slurry, stir at a high speed for 20 min, and then age for 16 h at 120° C. in a roller heater, respectively. Then, take out and cool down them, and measure the API filter loss with a medium-pressure filter press (Model SD4, purchased from QingDaoTongchung Oil Instrument Co., Ltd.), respectively. The results are shown in Table 1.

TABLE 1

| Sample | API Filter Loss/mL |
|---|---|
| 4 wt % bentonite slurry | 29 |
| GBFS-1 | 11 |
| GBFS-2 | 15 |
| GBFS-3 | 8.5 |
| GBFS-4 | 12 |
| GBFS-5 | 15 |
| Dopamine hydrochloride | 276 |
| Dopamine-modified polyacrylic acid | 11 |
| Dopamine-modified polyethylene glycol | 13 |

Test Example 4

This test example is used to measure the lap shear strength.

Bond two shale core samples (length: 12.5±0.5 mm, thickness: 2.0±0.1) by butt jointing with GBFS-1~GBF S-5, dopamine hydrochloride, dopamine-modified polyacrylic acid, dopamine-modified polyethylene glycol, polyvinyl acetate, ethyl cyanoacrylate, and epoxy resin in dry environment and water environment, respectively, and then apply longitudinal shearing force in opposite directions on the two samples bonded together by a servo tension tester, and measure the shearing force when the two shale core samples are separated from each other. The value of the shearing force is the lap shear strength. The results are shown in Table 2. The amount of the materials described above is the same for each test.

TABLE 2

| | Lap Shear Strength (MPa) | |
|---|---|---|
| Sample | Gluing in Dry Environment | Gluing in Water Environment |
| GBFS-1 | 3.8 ± 0.5 | 0.18 ± 0.04 |
| Polyvinyl acetate | 4 ± 1 | ≈0 |
| Ethyl cyanoacrylate | 7 ± 1 | ≈0 |
| Epoxy resin | 11 ± 2 | 0.07 ± 0.03 |
| GBFS-2 | 3.1 ± 0.3 | 0.12 ± 0.03 |
| GBFS-3 | 3.8 ± 0.2 | 0.18 ± 0.02 |
| GBFS-4 | 3.4 ± 0.3 | 0.16 ± 0.03 |
| GBFS-5 | 3.5 ± 0.5 | 0.16 ± 0.04 |
| Dopamine hydrochloride | 0 | 0 |
| Dopamine-modified polyacrylic acid | 1.2 ± 0.6 | ≈0 |
| Dopamine-modified polyethylene glycol | 2.1 ± 0.3 | 0.09 ± 0.03 |

Test Example 5

This test example is used to measure the shale core strength.

Obtain ten shale cores that have essentially the same properties, immerse nine of them in tap water, 3 wt % water solution of GBFS-1, 3 wt % water solution of GBFS-2, 3 wt % water solution of GBFS-3, 3 wt % water solution of GBFS-4, 3 wt % water solution of GBFS-5, 3 wt % water solution of dopamine hydrochloride, 3 wt % water solution of dopamine-modified polyacrylic acid, and 3 wt % water solution of dopamine-modified polyethylene glycol respectively; and then heat them by roll-heating at 120° C. for 16 h respectively. Leave the remaining shale core being untreated.

Take out the roll-heated shale cores, and immediately carry out uniaxial breaking test for them by a uniaxial compressive strength tester respectively, to evaluate the effect of the wellbore reinforcers to shale core strength. The results are shown in Table 3.

TABLE 3

| Shale Core Sample | Length, mm | Diameter, mm | Weight, g | Density, g/cm$^3$ | Breaking Strength, MPa |
|---|---|---|---|---|---|
| Blank shale core sample | 78.5 | 25.2 | 69.34 | 1.78 | 6.91 |
| water | 79.5 | 25.0 | 70.14 | 1.79 | 0.01 |
| GBFS-1 | 77.3 | 24.8 | 66.84 | 1.79 | 5.96 |
| GBFS-2 | 77.2 | 25.0 | 66.38 | 1.75 | 5.00 |
| GBFS-3 | 77.8 | 25.4 | 69.34 | 1.76 | 6.20 |
| GBFS-4 | 77.2 | 25.2 | 67.34 | 1.75 | 5.52 |
| GBFS-5 | 78.3 | 25.4 | 70.59 | 1.78 | 5.32 |
| Dopamine hydrochloride | 78.2 | 25.0 | 67.71 | 1.76 | 0.01 |
| Dopamine-modified polyacrylic acid | 76.6 | 25.2 | 66.55 | 1.79 | 2.31 |
| Dopaimne-modified polyethylene glycol | 77.6 | 24.8 | 67.06 | 1.79 | 4.89 |

Test Example 6

This test example is used to measure the percentage recovery of shale after roll-heated in sample solutions for 16 h.

Immerse approximately 30 g 6-10 meshes shale debris in 300 mL tap water, 3 wt % water solution of GBFS-1, 3 wt % water solution of GBFS-2, 3 wt % water solution of GBFS-3, 3 wt % water solution of GBFS-4, 3 wt % water solution of GBFS-5, 3 wt % water solution of dopamine hydrochloride, 3 wt % water solution of dopamine-modified polyacrylic acid, and 3 wt % water solution of dopamine-modified polyethylene glycol respectively; and then heat them by roll-heating at 120° C. for 16 h, and filter with a 40 meshes screen, and dry the debris left on the screen at 120° C. till the weight doesn't change any more. The ratio of this weight to the original weight of the shale debris is the percentage recovery. The results are shown in Table 4.

TABLE 4

| Sample | Percentage recovery/% |
|---|---|
| Tap water | 43.09 |
| GBFS-1 | 93.17 |
| GBFS-2 | 85.78 |
| GBFS-3 | 97.42 |
| GBFS-4 | 90.33 |
| GBFS-5 | 88.17 |
| Dopamine hydrochloride | 83.80 |
| Dopamine-modified polyacrylic acid | 81.59 |
| Dopamine-modified polyethylene glycol | 65.48 |

While some preferred embodiments of the present invention are described above, the present invention is not limited to the details in those embodiments. The person skilled in the art can make modifications and variations to the technical scheme of the present invention, without departing from the spirit of the present invention. However, all these modifications and variations shall be deemed as falling into the protected scope of the present invention.

In addition, it should be noted: the specific technical features described in above embodiments can be combined in any appropriate form, provided that there is no conflict. To avoid unnecessary repetition, the possible combinations are not described specifically in the present invention.

Moreover, different embodiments of the present invention can be combined freely as required, as long as the combinations don't deviate from the ideal and spirit of the present invention. However, such combinations shall also be deemed as falling into the scope disclosed in the present invention.

The invention claimed is:

1. A method for preparation of a polymer containing constitutional units represented by formula III, comprising:
   (1) reacting polymer containing constitutional units represented by formula III with an unsaturated carboxylic acid represented by general formula $R_4CH=CHCOOH$ in a graft copolymerization reaction;
   (2) condensing the polymer obtained in (1) with dopamine and/or dopamine hydrochloride;

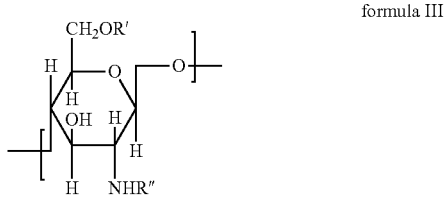

formula III wherein, R' and R" are H or $—CH_2COOR_3'$ independently, and R' and R" are not H at the same time; $R_3'$ is H or an alkali metal; and $R_4$ is H or $C_1$-$C_{10}$ alkyl; wherein in (1), conditions of the graft copolymerization reaction include: reaction temperature is 50-90° C. and reaction time is 1-10 h; calculated in hydroxyl in the polymer containing the constitutional units represented by formula III, the molar ratio of the polymer containing the constitutional units represented by formula III to the unsaturated carboxylic acid is 1:0.1-4, wherein the weight average molecular weight of the polymer is 50,000-100,000 g/mol.

2. The method according to claim 1, wherein conditions of the graft copolymerization reaction include: reaction temperature is 60-80° C. and reaction time is 2-6 h; calculated in hydroxyl in the polymer containing the constitutional units represented by formula III, the molar ratio of the polymer containing the constitutional units represented by formula III to the unsaturated carboxylic acid is 1:0.5-3.

3. The method according to claim 1, wherein the graft copolymerization reaction proceeds with an initiator in presence, and the initiator is one or more selected from the group consisting of ammonium eerie nitrate, potassium persulfate, and ammonium persulfate.

4. The method according to claim 1, wherein carbon number in the unsaturated carboxylic acid is 3-11.

5. The method according to claim 4, wherein the carbon number in the unsaturated carboxylic acid is 3-7.

6. The method according to claim 1, wherein in (2), the conditions of the condensation reaction include: reaction temperature is 20-40° C. and reaction time is 6-36 h; the molar ratio of the amount of the polymer prepared in (1) calculated in carboxyl to the total amount of the dopamine and dopamine hydrochloride calculated in amido is 1:0.01-0.2.

7. The method according to claim 1, wherein the condensation reaction proceeds with a catalyst in presence, and the catalyst is 1-(3-dimethylaminopropyl)-3-ethylcarbodiimide hydrochloride and/or N,N'-diisopropyl carbodiimide.

* * * * *